United States Patent [19]
Baker et al.

[11] Patent Number: 5,032,148
[45] Date of Patent: Jul. 16, 1991

[54] MEMBRANE FRACTIONATION PROCESS

[75] Inventors: Richard W. Baker, Palo Alto; Johannes G. Wijmans, Menlo Park, both of Calif.

[73] Assignee: Membrane Technology & Research, Inc., Menlo Park, Calif.

[21] Appl. No.: 432,985

[22] Filed: Nov. 7, 1989

[51] Int. Cl.$^5$ .................. B01D 53/22; B01D 53/04
[52] U.S. Cl. ................................ 55/16; 55/68; 55/74; 62/18
[58] Field of Search ............... 55/16, 23, 68, 158, 55/74; 62/18

[56] References Cited

U.S. PATENT DOCUMENTS

| | | | |
|---|---|---|---|
| 3,250,080 | 5/1966 | Garwin | 55/16 X |
| 3,324,626 | 6/1967 | Dresser et al. | 55/23 X |
| 4,119,417 | 10/1978 | Heki et al. | 55/16 X |
| 4,243,701 | 1/1981 | Riley et al. | 55/158 X |
| 4,264,338 | 4/1981 | Null | 55/16 |
| 4,435,191 | 3/1984 | Graham | 55/16 |
| 4,444,571 | 4/1984 | Matson | 55/16 |
| 4,529,411 | 7/1985 | Goddin, Jr. et al. | 55/16 |
| 4,553,983 | 11/1985 | Baker | 55/16 |
| 4,602,477 | 7/1986 | Lucadamo | 55/158 X |
| 4,639,257 | 1/1987 | Duckett et al. | 55/16 |
| 4,654,063 | 3/1987 | Auvil et al. | 55/158 X |
| 4,675,030 | 6/1987 | Czarnecki et al. | 55/158 X |
| 4,717,407 | 1/1988 | Choe et al. | 55/158 X |
| 4,817,392 | 4/1989 | Agrawal et al. | 62/18 |
| 4,934,148 | 6/1990 | Prasad et al. | 62/24 |

FOREIGN PATENT DOCUMENTS

| | | | |
|---|---|---|---|
| 0100923 | 2/1984 | European Pat. Off. | 55/16 |
| 0186843 | 7/1986 | European Pat. Off. | 55/16 |
| 63-175602 | 7/1988 | Japan | 55/16 |

*Primary Examiner*—Robert Spitzer
*Attorney, Agent, or Firm*—J. Farrant

[57] ABSTRACT

A fractionation process for treating a gas stream containing organic vapor in a concentration technically or economically difficult to treat by standard waste control methods. Typically this concentration will be about 0.1–10% organic vapor. The process involves running the stream through a membrane system containing one or more membranes selectively permeable to the organic vapor component of the gas stream. The fractionation produces two streams: a product residue stream containing the organic vapor in a concentration less than about 0.5% and a product permeate stream highly enriched in organic vapor content. Both residue and permeate streams are then suitable for treatment by conventional separations or waste control technologies. The low concentration residue stream might be passed to carbon adsorption beds, for example, and the high concentration permeate stream might be subjected to condensation or incineration.

8 Claims, 14 Drawing Sheets

MEMBRANE FRACTIONATION PROCESS

BACKGROUND OF THE INVENTION

Curbing the emission of vent gases contaminated with organic vapors is an urgent environmental problem. Of particular concern are streams containing halogenated hydrocarbons, frequently used as solvents, or chlorofluorocarbons (CFCs), which deplete the earth's protective ozone layer. Treatment methods may be chemical, in which case the organic substance is destroyed completely or converted to another form, or physical treatment, in which case the waste is changed in volume or composition, and there is an opportunity for recovery of the organic. A variety of separations or treatment technologies are described in the literature, yet few are in use, either because the technology has not been developed to the industrial level, or because the process is too costly for general application. The cost of most treatment processes is concentration dependent. The widely used processes are carbon adsorption, incineration and compression condensation. Carbon adsorption becomes expensive above about 0.1–0.5% organic content in the stream to be treated, because the plant operating and capital costs increase with increasing solvent concentration. Also, high concentration leads to unacceptably high temperatures in the carbon bed, because the adsorption step is exothermic. Consequently process streams must frequently be diluted many-fold before being passed to the carbon beds.

Incineration, because it involves burning the organic vapor with a supplementary fuel, such as natural gas, is best suited to relatively concentrated streams. Incineration is relatively costly when the concentration of organic in the stream is below about 5–10%. Neither carbon adsorption nor incineration is easily conducive to organic vapor recovery, and both can create secondary waste or pollution problems; in the case of carbon adsorption, spent contaminated carbon from the beds, and in the case of incineration, large volumes of carbon dioxide or other combustion products.

It is, therefore, highly desirable to limit the quantities of organics that need to be treated by these methods. Prior to discharge or treatment, many organic-containing gas streams are sent to condensation or compression-condensation systems. In these systems, the gas is chilled to below its dewpoint temperature, with or without prior compression. With appropriate compounds, a substantial amount of the organic condenses out and can be recovered. Problems encountered in condensation are (1) low organic concentration in the stream, and/or low boiling point, so that the dewpoint is difficult to reach, and (2) formation of ice in the condenser brought about by water vapor in the feedstream. Condensation becomes expensive and impractical if the organic content in the stream to be treated is below about 20–30% of the saturation concentration at room temperature and pressure. For condensation to be economically viable, a feed concentration as much as 40–50% is frequently required.

There is, thus, a treatment gap in the concentration range at least above about 0.1–0.5% and below about 5–50%, depending on the compound, which the existing technologies are ill suited to fill. Consequently organic-laden streams in this concentration range must often be diluted or concentrated before they can be fed to the treatment process. An efficient, economic separation process, capable of handling streams in this range at source, would represent a valuable addition to pollution control technologies.

SUMMARY OF THE INVENTION

The invention is a membrane process that fractionates gas streams containing organic vapor at concentrations difficult to handle by other technologies, in other words, outside the optimum concentration ranges for carbon adsorption, incineration or condensation. The result is two product streams, both of which are within concentration ranges suitable for treatment by these processes, and no other secondary streams. The gas stream to be treated may be an effluent stream that would otherwise be discharged into the atmosphere untreated, or would be subject to some other treatment method or methods. Alternatively it may be an internal process stream from which it is desirable, for example, to recover one or more organic components for reuse. Table 1 summarizes the representative features of carbon adsorption, incineration and condensation. The last column shows the corresponding features of membrane fractionation.

TABLE 1

Features of the Principal Volatile Organic Compound Treatment Systems

| Feature | Carbon Adsorption | Incineration | Compression Condensation | Membrane Fractionation |
|---|---|---|---|---|
| Effect of feedstream solvent concentration on cost per scfm treated | increases with increasing concentration | decreases with increasing concentration | decreases with increasing concentration | independent of concentration |
| Typical feedstream concentrations used | <0.5% | >5% | 20–100% | 0.1–10% |
| Size and mobility | large, immobile | large, immobile | large, immobile | compact, mobile |
| Ease of operation | complex | simple | simple | simple |
| Typical solvent removals | >95% | 100% | 95% | 80–99% |
| Is solvent recovery possible? | yes | no | yes | yes |
| Are secondary waste streams created? | yes - spent carbon | combustion products, $CO_2$ | no | no |
| Versatility | used for many organics, including chlorinated solvents, although corrosion can be a problem | is not suited to chlorinated and fluorinated organics | works with almost all organics with boiling point above room temperature | works with almost all volatile organics |
| Capital cost ($/scfm treated) | $100–200 for dilute streams (<0.1%); $200–1000 for concentrated streams (1.0–2%) | <$100 | — | $400–1,000/scfm |
| Operating cost | $0.2–3.0 | $1.0–5.0 | $0.2–3.0 | $0.5–1.0 |

TABLE 1-continued

| | Features of the Principal Volatile Organic Compound Treatment Systems | | | |
|---|---|---|---|---|
| Feature | Carbon Adsorption | Incineration | Compression Condensation | Membrane Fractionation |
| ($/1000 scfm treated) | increases with increasing feed concentration | | decreases with increasing feed concentration and is a strong function of boiling point | |

It can be seen that membrane fractionation offers a new technique for converting streams in the organic concentration range above about 0.1% and below about 20–50% saturation, where other processes are inefficient and costly, to streams that can be handled efficiently. Membrane fractionation has various other advantages, including mobility; ease of operation; opportunities for organic recovery and reuse; versatility; absence of secondary streams; use at the source of the waste, without prior pooling, dilution or concentration of the stream; and favorable payback times.

The process of the invention involves running a feedstream containing organic vapor across a membrane that is selectively permeable to that vapor. The vapor is therefore concentrated in the stream permeating the membrane; the residue, non-permeating, stream is correspondingly depleted in organic content. The driving force for permeation across the membrane is the pressure difference on the feed and permeate sides. The fractionation produces permeate and residue streams containing organic vapors in concentrations that can be treated by existing separations technology. What is done with the two streams when they leave the membrane unit will depend on the nature of the organic, its economic value, its degree of harmfulness as a pollutant and other practical factors. In general, physical treatment methods provide opportunities for organic chemical recovery; chemical methods destroy the organic material, and may or may not reduce it to harmless reaction products. It may be, for example, that the organic is a standard solvent, such as hexane, which is cheap to buy, but hazardous to the environment. The permeate stream, containing a high percentage of the organic material, might then be incinerated. If the economics are attractive, condensation is preferred over incineration as a treatment method for the concentrated permeate stream. Condensation can be used for a wider variety of organics, including many chlorinated compounds that are non-flammable. Also condensation permits organic recovery and reuse, and creates no secondary combustion products. The residue stream can be treated by carbon adsorption or some other process. In some circumstances, the residue stream may be clean enough for direct discharge to the environment without any further treatment.

The efficiency of the process, in terms of the relative proportions of organic vapor and other components in the feed, permeate and residue streams, will be determined by a number of factors, including the pressure difference, the selectivity of the membrane, the proportion of the feed that permeates the membrane, and the membrane thickness. The membrane fractionation process may be configured in many possible ways. Examples include a single membrane stage; a multistage system, where the membranes are connected in a cascade arrangement such that the permeate from one stage forms the feed for the next; a multistep system, where the membranes are connected in a series arrangement such that the residue from one step becomes the feed for the next; or mixed combinations of these, including those in which one or more of the permeate or residue streams is recycled within the membrane system. Two-stage membrane systems are particularly advantageous, because they can achieve very high degrees of enrichment of the organic component in a highly cost-effective manner. Eighty percent or above removal of the organic content of the feed can typically be achieved with an appropriately designed membrane fractionation process, leaving a residue stream containing only traces of organic. The permeate stream is typically concentrated 5- to 100-fold compared with the feedstream.

The membrane used in the fractionation process is selectively permeable to the organic component of the feedstream, so that the organic component is enriched in the permeate compared with the feed. The permselective membrane materials used in the invention are preferably rubbery polymers at the operating conditions of the system, that is, they have glass transition temperatures below the temperature of the feed gas.

To achieve a high flux of the permeating components, the permselective membrane should be made very thin. A preferred embodiment of the invention involves the use of a composite membrane comprising a microporous support, onto which the rubbery permselective layer is deposited as an ultrathin coating. The preparation of such membranes is known in the art, and is discussed in detail below.

The membrane configuration is not critical to the invention. In a preferred embodiment, the membranes are cast and coated as flat sheets, and then rolled into spiral-wound modules. However, other types of configuration, such as hollow fibers, plate-and-frame, or flat sheet membranes are also possible, and are intended to be within the scope of the invention.

The flux of a gas or vapor through a polymer membrane is proportional to the pressure difference of that gas or vapor across the membrane. To achieve high fluxes of the permeating components, it is desirable not only to make the permselective membrane very thin, but also to operate the system with a substantial pressure drop across the membrane. The pressure drop is preferably achieved by lowering the pressure on the permeate side of the membrane. This may be done by cooling and compressing the permeate, for example, or by means of a vacuum pump. The ratio of the pressures on the permeate and feed sides of the membrane, and the ratio of the permeate flow and feed flow volumes also influence the performance of the process.

It is an object of the invention to provide a fractionation process for dividing organic-vapor laden streams into two streams, both within concentration ranges suitable for treatment by other separations or waste treatment technology.

It is an object of the invention to provide a treatment process for handling gas streams containing organic vapors.

It is an object of the invention to provide a treatment process for handling gas streams containing organic vapors to facilitate recovery of the organic compound.

It is an object of the invention to provide a process that can treat gas streams containing organic vapors at their source point.

It is an object of the invention to provide a process that can treat gas streams containing organic vapors without the need for predilution of the gas stream.

It is an object of the invention to reduce organic chemical emissions to the atmosphere.

It is an object of the invention to provide motivation for industries discharging organic vapors to reduce or eliminate their emissions.

Other objects and advantages of the invention will be apparent from the description of the invention to those of ordinary skill in the art.

Although the fractionation process has been described in terms of a waste reduction or treatment technology, it should be clear that the process is equally applicable to the separation of organic in the appropriate concentration range from any gas stream. The stream to be treated will most likely be air, but could be any gas or mixture of gases.

It is to be understood that the above summary and the following detailed description are intended to explain and illustrate the invention without restricting its scope.

DETAILED DESCRIPTION OF THE INVENTION

Figure 1:
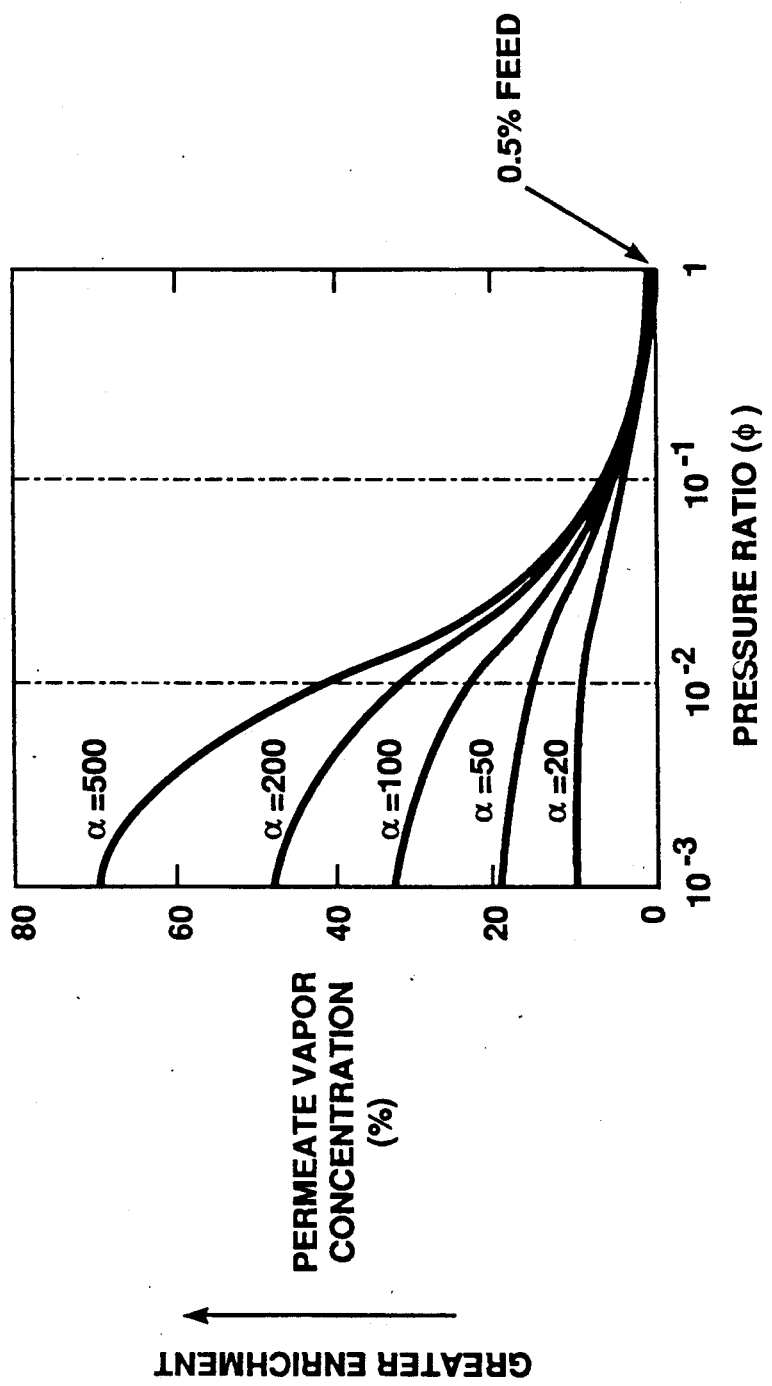
FIG. 1 is a graph showing the relationship between permeate vapor concentration and pressure ratio for membranes of varying selectivities.

The term vapor as used herein refers to organic compounds in the gaseous phase below their critical temperatures.

The term CFC as used herein refers to fluorinated hydrocarbons containing at least one fluorine atom and one chlorine atom.

The term permselective as use herein refers to polymers, or membranes made from those polymers, that exhibit selective permeation for at least one gas or vapor in a mixture over the other components of the mixture, enabling a measure of separation between the components to be achieved.

The term multilayer as used herein means comprising a support membrane and one or more coating layers.

The term selectivity as used herein means the ratio of the permeabilities of gases or vapors as measured with gas or vapor samples under the normal operating conditions of the membrane.

The term residue stream means that portion of the feedstream that does not pass through the membrane.

The term permeate stream means that portion of the feedstream that passes through the membrane.

The term series arrangement means an arrangement of membranes connected together such that the residue stream from one becomes the feedstream for the next.

The term cascade arrangement means an arrangement of membranes connected together such that the permeate stream from one membrane becomes the feedstream for the next.

The term membrane array means a set of individual membranes connected in a series arrangement, a cascade arrangement, or mixtures or combinations of these.

The term product residue stream means the residue stream exiting a membrane array when the membrane fractionation process is complete. This stream may be derived from one membrane, or may be the pooled residue streams from several membranes.

The term product permeate stream means the permeate stream exiting a membrane array when the membrane fractionation process is complete. This stream may be derived from one membrane, or may be the pooled permeate streams from several membranes.

All percentages cited herein are by volume unless specifically stated otherwise.

In the process of the present invention, a feedstream containing an organic vapor is passed across a thin, permselective membrane. The sources of the feedstreams to be fractionated are diverse. Many industrial processes produce waste gas streams containing low concentrations of organic vapors. For example, solvent-containing airstreams are produced as a result of solvent vaporization in the drying of synthetic fibers and films, plastics, printing inks, paints and lacquers, enamels and other organic coatings. Solvents are also used in the preparation of adhesive coatings and tapes. Waste gases containing organic vapors are generated by solvent degreasing operations in the metal and semiconductor industries. Hydrocarbon vapors are released from petroleum storage tanks during transfer operations. Commercial dry-cleaning facilities produce air emissions containing chlorinated hydrocarbons in large quantities; industrial dry-cleaning produces similar emissions containing naphtha. Chlorinated fluorocarbons (CFCs) are emitted to the atmosphere in huge quantities from plants manufacturing polyurethane and other plastic foams. Other sources of extensive CFC pollution are refrigeration operations, air conditioning and fire extinguisher filling and use. The concentration of these streams varies widely, from a few ppm to as high as 40-50% organic. There are many streams, particularly in solvent degreasing, dry cleaning, foam production and CFC manufacture, that contain the organic vapor in a concentration above about 0.1-0.5% and below about 30% of the saturation concentration. Such streams are too concentrated to be economically handled by carbon adsorption or other technologies for dealing with low concentration streams, yet too dilute for cost-effective treatment by incineration or compression condensation. Thus the fractionation process of the invention offers a solution to the problem of handling such streams. Organic vapors that can be handled by the process include, but are not limited to, chlorofluorocarbons such as CFC-11($CCl_3F$), CFC-12($CCl_2F_2$), CFC-113($C_2Cl_3F_3$), CFC-114($C_2Cl_2F_4$), CFC-115($C_2ClF_5$), HCFC-21 ($CHCl_2F$), HCFC-22($CHClF_2$), HCFC-23($CHF_3$), HCFC-123($C_2HCl_2F_3$), HCFC-142b($C_2H_3ClF_2$), Halon-1211($CF_2ClBr$), Halon-1301($CF_3Br$) and Halon-2402($C_2F_4Br_2$); chlorinated hydrocarbons, such as tetrachloroethylene, trichloroethylene, methylene chloride, 1,1,1-trichloroethane, 1,1,2-trichloroethane, carbon tetrachloride, chlorobenzene, dichlorobenzene; and non-halogenated hydrocarbons, such as acetone, xylene, ethyl acetate, ethyl benzene, ethyl ether, cyclohexane, ethanol, methanol, and other alcohols, cresols, nitrobenzene, toluene, methyl ethyl ketone, carbon disulfide, isobutanol, benzene, propane, butane, pentane, hexane and octane. Many of these organic-component-containing streams will comprise the organic material in air. Mixtures of organic components in nitrogen are also commonly encountered, because nitrogen is frequently used as a blanketing gas. Streams of organic compounds in other gases, or streams comprising mixtures of organics are also found. For example, hydrogenation reactions in the chemical industry yield off-gas streams containing hydrogen and various hydrocarbons. Treatment of such streams could be carried out using a membrane type preferentially permeable to the hydrocarbon component. Mixed organic component streams might arise, for example, from natural gas processing or petrochemical refining, where the stream could contain a mixture of methane, ethane, propane, butane and so on.

The permselective membrane forms a barrier that is relatively permeable to an organic vapor component of the stream, but relatively impermeable to other gases in the stream. The membrane may take the form of a homogeneous membrane, a membrane incorporating a gel or liquid layer, or dispersed particulates, or any other form known in the art. Preferred embodiments of the invention employ a multilayer membrane comprising a microporous support onto which is coated an ultrathin permselective layer of a rubbery polymer. The microporous support membrane should have a flow resistance that is very small compared to the permselective layer. A preferred support membrane is an asymmetric Loeb-Sourirajan type membrane, which consists of a relatively open, porous substrate with a thin, dense, finely porous skin layer. Preferably the pores in the skin layer should be less than 1 micron in diameter, to enable it to be coated with a defect-free permselective layer. The support membrane should resist the solvents used in applying the permselective layer. Polyimide or polysulfone supports are preferred for solvent resistance. Commercial ultrafiltration membranes, for example, NTU ®4220 (crosslinked polyimide), or NTU ®3050 (polysulfone) from Nitto Electric Industrial Company, Osaka, Japan, are suitable as supports. Other suitable support membranes may be made by the processes for making finely microporous or asymmetric membranes known in the art. Polymers which may be used in addition to polysulfone or polyimide include polyvinylidene fluoride (for example, Kynar ®461, Pennwalt Corp., Philadelphia, Pa.), or aromatic polyamides (for example, Nomex ®450, DuPont, Wilmington, De). Simple isotropic supports, such as microporous polypropylene or polytetrafluoroethylene can also be used. The thickness of the support membrane is not critical, since its permeability is high compared to that of the permselective layer. However the thickness would normally be in the range 100 to 300 microns, with about 150 microns being the preferred value.

Optionally, the support membrane may be reinforced by casting it on a fabric or paper web. The multilayer membrane then comprises the web, the microporous membrane, and the ultrathin permselective membrane. The web material may be made from polyester or the like. The permselective layer could not be cast directly on the fabric web, because it would penetrate the web material, rather than forming an unbroken surface coating.

To separate the organic vapor from the feedstream requires a permselective layer that is preferentially permeable to the organic vapor. The mathematical model used to predict permeation behavior is the solution-diffusion model. In simple systems, where the rate-limiting step is diffusion through the membrane, Fick's Law of diffusion leads to the equation $$J = \frac{Dk\Delta p}{l}, \qquad (1)$$

where J is the membrane flux ($cm^3$(STP)/$cm^2$.s.cmHg), D is the diffusion coefficient of the gas or vapor in the membrane ($cm^2$/sec) and is a measure of the gas mobility, l is the membrane thickness, k is the Henry's law sorption coefficient linking the concentration of the gas or vapor in the membrane material to the pressure in the adjacent gas ($cm^3$(STP)/$cm^3$.cmHg), and $\Delta p$ is the pressure difference across the membrane. The product Dk can also be expressed as the permeability, P, a measure of the rate at which a particular gas or vapor moves through a membrane of standard thickness (1 cm) under a standard pressure difference (1 cmHg).

A measure of the ability of a membrane to separate two components, (1) and (2), of a feedstream is the ratio of their permeabilities, α, called the membrane selectivity, $$\alpha_{2/1} = \frac{P_{(2)}}{P_{(1)}}. \qquad (2)$$

Some membrane materials, particularly rubbery polymers, possess an intrinsically high selectivity for organic solvents over air and can therefore be used in a membrane separation process. Preferred permselective membranes used in the invention therefore are rubbery non-crystalline polymers, that is, they have a glass transition temperature below the normal operating temperature of the system. Thermoplastic elastomers are also useful. These polymers combine hard and soft segments or domains in the polymer structure. Provided the soft segments are rubbery at the temperature and operating conditions of the invention, polymers of this type could make suitable membranes for use in the invention. Polymers that may be used include, but are not limited to, nitrile rubber, neoprene, silicones rubbers, including polydimethylsiloxane, chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, styrene/butadiene/styrene block copolymers, styrene/ethylene/butylene block copolymers, thermoplastic polyolefin elastomers, and block copolymers of polyethers and polyesters. To maximize the flux of permeating components, the permselective layer should be made very thin. However, the permselective layer must also be free of pinholes or other defects that could destroy the selectivity of the membrane by permitting bulk flow-through of gases. Particularly preferred rubbers are styrene-butadiene copolymers or silicone rubbers. The preferred membrane is one in which the permselective coating is deposited directly on the microporous support. However optional embodiments that include additional sealing or protective layers above or below the permselective layer are also intended to be encompassed by the invention.

The preferred method of depositing the permselective layer is by dip coating. In order to use this method, the polymer material that forms the permselective layer should be a film-forming material that is soluble in an organic solvent. The dip coating method is described, for example, in U.S. Pat. No. 4,243,701 to Riley et al., incorporated herein by reference. For example, a support membrane from a feed roll is passed through a coating station, then to a drying oven, and is then wound onto a product roll. The coating station may be a tank containing a dilute polymer or prepolymer solution, in which a coating, typically 50 to 100 microns thick, is deposited on the support. Assuming a 1% concentration of polymer in the solution, then after evaporation a film 0.5 to 1 micron thick is left on the support.

Alternatively, the permselective membrane may be cast by spreading a thin film of the polymer solution on the surface of a water bath. After evaporation of the solvent, the permselective layer may be picked up onto the microporous support. This method is more difficult in practice, but may be useful if the desired support is attacked by the solvent used to dissolve the permselective material.

The thickness of the permselective layer should normally be in the range 0.1 to 20 microns, more preferably 0.1–5 microns.

The form in which the membranes are used in the invention is not critical. They may be used, for example, as flat sheets or discs, coated hollow fibers, or spiral-wound modules, all forms that are known in the art. Spiral-wound modules are a preferred choice. References that teach the preparation of spiral-wound modules are S. S. Kremen, "Technology and Engineering of ROGA Spiral Wound Reverse Osmosis Membrane Modules", in Reverse Osmosis and Synthetic Membranes, S. Sourirajan (Ed.), National Research Council of Canada, Ottawa, 1977; and U.S. Pat. No. 4,553,983, column 10, lines 40–60. Alternatively the membranes may be configured as microporous hollow fibers coated with the permselective polymer material and then potted into a module.

A number of factors have an effect on the performance of the fractionation system. Important parameters are the selectivity of the membrane, the pressure drop from the feed to the permeate side of the membrane, the ratio of the permeate and feed pressures, and the ratio of the permeate and feed flows.

The permselective membranes used in the present invention should preferably have a selectivity for the organic vapor of at least 5, more preferably at least 10, and most preferably at least 20. However, contrary to some previous teachings in the art, extremely high selectivities are not necessary desirable or advantageous, as the examples and accompanying discussion show. Besides the selectivity, other factors determine the degree of enrichment of organic vapor obtained in a membrane process. The first is the extent of removal of organic vapor from the feed. When a given volume of the feedstream enters the membrane, it immediately begins to lose organic vapor, as the organic vapor preferentially permeates the membrane. Thus, the concentration of organic vapor in the feedstream decreases as it passes through the membrane module. The average concentration of the organic vapor on the feed side of the membrane will determine the average concentration of vapor on the permeate side of the membrane. If concentration of organic in the feed is reduced to a small value before it leaves the module, the average feed stream concentration will be low. As a result, the vapor enrichment in the permeate stream is low also. Thus, as organic removal from the feedstream is increased, the average concentration of organic vapor in the permeate decreases.

A second factor affecting the performance of a membrane system is the pressure of feed and permeate gas streams. The driving force for permeation is the difference between the partial pressures of the components on the feed and permeate sides. However, in addition, the ratio of the feed to the permeate pressures defined as $$\phi = \frac{\text{total permeate pressure } (p'')}{\text{total feed pressure } (p')} . \tag{3}$$

is important. The partial pressure of the organic vapor on the permeate side of the membrane must never exceed the partial pressure on the feed side, or the permeation process would stop. Thus, even for an infinitely selective membrane, the concentration of organic vapor on the permeate side of the membrane can never be greater than $1/\phi$ times the concentration in the feed.

The relationship between pressure ratio and selectivity can be derived from the Fick's law expression for the membrane fluxes, $J_1$ and $J_2$, given as $$J_1 = \frac{P_1 (p_1' - p_1'')}{l} , \tag{4}$$

and $$J_2 = \frac{P_2(p_2' - p_2'')}{l}, \tag{5}$$

where $P_1$ and $P_2$ are the permeabilities of components 1 and 2, l is the membrane thickness, and $P_1'$, $P_2'$ and $P_1''$, $p_2''$, are the partial pressures of the two gases or vapors in the feed and permeate streams, respectively. The total gas pressure is equal to the sum of the partial pressures, i.e., $$p' = p_1' + p_2' \quad (a) \tag{6}$$
$$p'' = p_1'' + p_2'' \quad (b)$$

The volume fractions, $C_1'$ and $C_2'$ of the two components in the feed, and in the permeate, $C_1''$ and $C_2''$ are given by:

$$C_1' = \frac{p_1'}{p'}, \quad C_1'' = \frac{p_1''}{p''}, \quad (c) \tag{7}$$

$$C_2' = \frac{p_2'}{p'}, \quad C_2'' = \frac{p_2''}{p''}, \quad (d)$$

Combining equations (3–7) then yields the expression $$C_2'' = \frac{1}{2} \cdot \frac{1}{\phi} \left( C_2' + \phi + \frac{1}{\alpha - 1} - \sqrt{\left(C_2' + \phi + \frac{1}{\alpha - 1}\right)^2 - \frac{4\phi C_2' \alpha}{\alpha - 1}} \right), \tag{8}$$

At low pressure ratios, i.e., relatively modest permeate vacuums, when $\alpha_{2/1} >> 1/\phi$, the permeate concentration, $C_2''$, is proportional to the pressure ratio across the membrane and is essentially independent of the membrane's selectivity, $\alpha_{2/1}$. This is the pressure controlled region. At high pressure ratios, i.e., relatively low permeate vacuums, when $\alpha_{2/1} << 1/\phi$, the permeate concentration is proportional to the membrane selectivity and is essentially independent of the pressure ratio across the membrane. This is the membrane selectivity controlled region. There is an intermediate region between these two limiting cases when both the pressure ratio and the membrane selectivity affect the membrane system performance. These three regions are illustrated in FIG. 1, which plots the calculated permeate organic vapor concentration, $C_2''$, against pressure ratio, $\phi$, for membranes of selectivities 20, 50, 100, 200 and 500.

The pressure drop across the membrane can be achieved by pressurizing the feed, by evacuating the permeate or by both. Because the volume of the permeate stream is much less than the volume of the feed, it is energy and cost effective, and therefore preferable in the context of the invention, to operate in the vacuum mode, i.e., drawing a partial vacuum on the permeate side. At pressure ratios between 0.01 and 0.001, very large differences in performance with differing selectivity can be achieved. However, to achieve such pressure ratios involves drawing a hard vacuum on the permeate side. The feedstream is only slightly pressurized to force the feed gas through the membrane module, preferably not more than to about 5 atm pressure, more preferably to not more than 2 atm pressure, and most preferably to only a few psig over atmospheric pressure. Therefore, a pressure ratio of 0.1 is roughly equivalent to a permeate pressure of 8 cmHg, a pressure ratio of 0.01 to a permeate pressure of 0.8 cmHg, and a pressure ratio of 0.001 to a permeate pressure of 0.08 cmHg. Pressures less than 1 cmHg can be achieved in a laboratory-scale experiment, but will be difficult and very expensive to realize in a full-scale industrial process. Therefore, a value of 0.005 is probably the preferable lower limit for practical pressure ratios in an industrial setting. FIG. 1 shows that for pressure ratios ranging from 0.1 to 1, the separation achieved is modest and is largely independent of the membrane selectivity, i.e., the separation is pressure ratio controlled. The preferred operating zone for the processes of the invention, therefore, is generally in the middle region of FIG. 1, where a good separation can be achieved by combining a membrane with a good, but not excessively high, selectivity, typically in the range 5–200, with a pressure ratio in an economically sustainable range, such as 0.005–0.5. This limits the maximum enrichment of organic vapor obtained in a single-stage industrial system to this range.

The ratio of the permeate flow to the feed flow is called the stage cut. The degree of depletion of the more permeable component from the feed depends on the stage-cut. When a membrane system is operated at a high stage-cut, the feed gas becomes substantially depleted in the more permeable components. As a result, the average concentration of the more permeable component seen by the membrane is substantially lower than the initial feed gas concentration. The result is a fall in the concentration of the more permeable component in the permeate stream. Suppose that a stream contains 4% organic vapor and it is desired to reduce the concentration to 0.5%. If only the organic vapor permeated the membrane, then the permeate flow would be pure organic, and would be 3.5% of the total feed flow. Thus, the minimum stage-cut to achieve this degree of separation would be 3.5%. In practice, the stage-cut will always be higher than this, because the other gases in the feed will also permeate the membrane to some extent. However, for the process to be efficient, the stage-cut should be kept low, preferably below 40% and most preferably below 30%.

The process of the invention is carried out using system designs tailored to particular requirements in terms of percentage of organic vapor removed from the feed, or the degree of concentration of the permeate. The membrane fractionation process should preferably remove 80% or more of the organic content of the feed. This level of removal may frequently be obtained with a single membrane step. Removals up to 95%, or even 99%, are also possible with a membrane fractionation process. To achieve a very high degree of organic removal may require a two-step or multistep design. The residue stream from the fractionation process should be reduced in organic vapor content to the point where treatment by carbon adsorption or another treatment appropriate for low concentrations of organic contamination can be used in a cost-effective manner. The organic concentration in the residue will generally be below about 0.5%, and most preferably below about 0.1%. A particular advantage of membrane fractionation, compared with straight dilution of the feedstream with clean air or gas, is that the total volume of waste gas to be treated is not increased.

The permeate stream from the fractionation process should be increased in organic vapor content to the point where treatment by incineration or compression condensation becomes cost-effective. The degree of concentration required to reach this point will vary from organic to organic. If incineration is to be used, then the most preferred concentration of organic in the permeate will be such that the stream can be burnt with a minimal addition of supplementary fuel. Condensation or compression condensation is preferable to incineration in the case of most organics, because air pollution is minimized and the organic material can be recovered. The degree of concentration of the organic in the permeate required to make compression condensation efficient will depend in part on the boiling point of the organic. The concentration should be such that the permeate stream can be brought to the dewpoint of the organic without excessive compression or cooling. It is preferable that the dewpoint can be reached at a pressure less than 5-10 atmospheres, more preferably less than 2 atmospheres, and a temperature above 0° C. For example, if the permeate stream is 50% saturated at room temperature, the dewpoint will be reached by compressing to 2 atmospheres. Therefore, compressing the permeate to 10 atmospheres and chilling will remove more than 80% of the organic vapor. If the permeate stream is 30% saturated at room temperature, the dewpoint will be reached by compressing to 3.3 atmospheres. Therefore, compressing the permeate to about 15 atmospheres and chilling will achieve 80+% removal. If the permeate stream is 20% saturated at room temperature, the dewpoint will be reached by compressing to 5 atmospheres. Therefore, compressing the permeate to about 15 atmospheres and chilling will achieve 70+% removal. Compressing the permeate above about 15 atmospheres requires a large energy consumption and becomes relatively expensive. If the permeate has to be cooled below 0° C., then ice formation in the condenser from water vapor entrained in the permeate vapor may occur. Taking all these considerations into account, preferably the fractionation process should be designed to produce a permeate organic vapor concentration that is greater than the 20% saturation concentration at 1 atmosphere pressure and 20° C. More preferably, the permeate organic vapor concentration should be greater than 30% saturation concentration at 1 atmosphere pressure and 20° C., and most preferably, greater than 50% saturation concentration.

Figure 2:
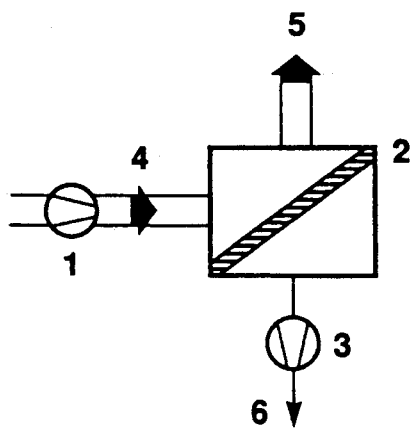
FIG. 2 is a schematic diagram of a single stage membrane system for treating an organic-containing stream.
Figure 3:
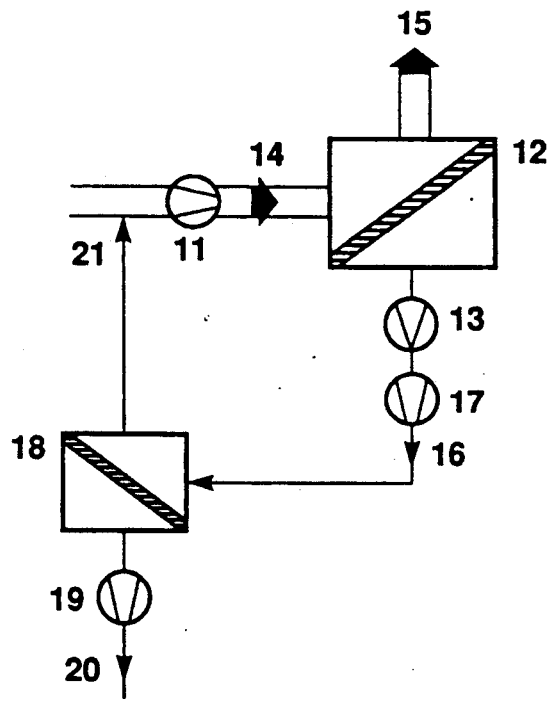
FIG. 3 is a schematic diagram of a two-stage membrane system for treating an organic-containing stream.

The details of the fractionation process tailored to meet the above requirements will depend on the selectivity, operating pressure and stage cut, as discussed above. A basic fractionation process is shown schematically in FIG. 2. Referring now to this figure, the system comprises a feed air compressor, 1, membrane unit containing one or more membrane modules, 2, and permeate vacuum pump, 3. In this unit, the feedstream, 4, is compressed and passed through the membrane module. The treated residue stream, 5, contains a small percentage of vapor, in a concentration appropriate for treatment by carbon adsorption, for recycling to the process that generated it, or for discharge to the atmosphere. The permeate stream, 6, is enriched in the organic vapor so that it contains the vapor in a concentration appropriate for incineration or compression condensation. A single-stage vapor separation system such as this is generally able to remove 80-90% of the organic vapor from the feed gas to produce a permeate that has five to ten times the concentration of the feed gas. This degree of separation is adequate in many cases, and produces residue and permeate streams that fall within concentration ranges that can be economically handled by conventional treatment processes. If the permeate stream after one membrane treatment is still too dilute, then further concentration of the organic may be required to bring it to the range where it can be economically incinerated or condensed and recovered. A two-stage fractionation process, as shown in FIG. 3, may then be used. Referring now to FIG. 3, the feedstream, 14, passes through a compressor, 11, and thence to a first stage membrane unit, 12. The treated residue stream, 15, is sent to further treatment, vented or recycled as above. A vacuum pump, 13, is used on the permeate side of the membrane unit. The permeate stream from the first membrane unit, 16, is compressed in compressor, 17, and forms the feed to the second stage membrane unit, 18. The pressure drop across this unit is provided by vacuum pump, 19, and the permeate stream, 20, can be treated by compression condensation or incineration. The residue stream, 21, from the second membrane unit may optionally be combined with the feedstream, 11. This configuration allows organic enrichments typically up 100-fold to be achieved. Because the feedstream to the second stage is very much smaller than the feed to the first, the second stage is normally only 10-20% as large as the first stage.

Many variations on this two-stage process are possible. One representative example, including treatment of the permeate by condensation, and treatment of the residue by carbon adsorption, is given in FIG. 4. Referring now to this figure, the feedstream, 26, passes through a compressor, 22, and thence to a first stage membrane unit, 23. The treated residue stream, 27, is sent to carbon adsorption unit, 38. A vacuum pump, 24, is used on the permeate side of the membrane unit, and the permeating vapor stream, 28, is condensed to a liquid organic stream, 29, by condenser, 25. The non-condensed vapor and gas stream, 30, becomes the feed for a second membrane unit, 31. The permeate from this unit, 33, passes to vacuum pump, 32, and condenser, 34, to form a liquid organic stream, 35, and a non-condensed stream, 36, that can be recycled to the feed side of the membrane. The residue stream, 37, from the second membrane unit is combined with the feedstream, 22. Such a two-stage process could also be run without the condensation step between the two membrane stages, if the organic concentration in the permeate after the first stage was still relatively low. Recycling both the non-condensed fraction of the second permeate, and the residue from the second membrane stage, within the membrane system is also optional. However, recycle is preferred where the composition of these streams is still within the range that is best treatable by membrane fractionation.

Figure 5:
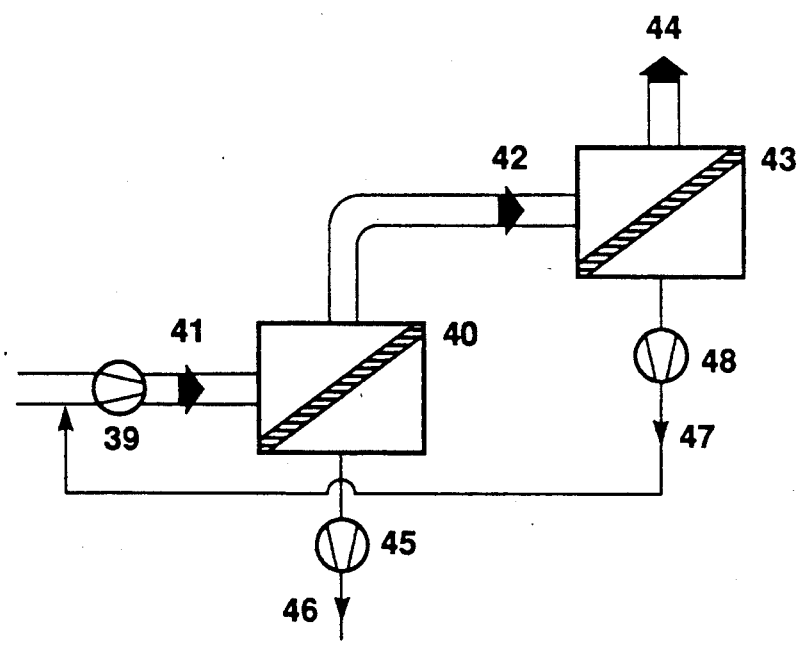
FIG. 5 is a schematic diagram of a two-step membrane system for treating an organic-containing stream.

A third system design may be preferred when a high degree of organic vapor removal from the feed is necessary. A two-step process, in which the residue from the first step is subjected to further treatment, can then be used. Organic removals of 95-99% can be achieved. The second step required to reduce the feed concentration from 10% to 1% of the initial value is approximately as large as the first step required to reduce the feed concentration from 100% to 10% of the initial value. FIG. 5 shows such a system. Referring now to this figure, the feedstream, 41, passes through a compressor, 39, and thence to a first step membrane unit, 40. The residue stream, 42, is fed to the second step membrane unit, 43. The treated residue stream, 44, is passed to further treatment, vented or recycled as above. Vacuum pump, 45, is used on the permeate side of the first step membrane unit, and the permeating vapor stream, 46, is sufficiently enriched in organic vapor content for treatment by compression condensation or incineration. The permeate stream, 47, from the second step membrane unit may optionally be recycled via vacuum pump, 48, to be combined with the incoming feedstream.

The above descriptions are representative of relatively simple membrane systems that can be used to carry out the fractionation process of the invention. It should be apparent from the discussion herein that the membrane system for carrying out the process should be configured based on the composition of the feedstream and the desired compositions of the product residue and product permeate streams. The performance that can be obtained from the system will depend on the membrane selectivity and thickness, and the operating parameters, such as feed and permeate pressures and stage cut.

To achieve the desired performance may require an array of membrane units in a cascade arrangement such that the permeate from one unit becomes the feed for the next. A cascade array may contain two, three or more sets of membrane units or stages. The residue stream from the individual stages may conveniently, although not necessarily, be recycled within the array and mixed with a feed of similar organic concentration. Such a cascade arrangement may be appropriate, for example, where a relatively dilute feedstream is to be treated to yield a product permeate stream with a high degree of enrichment of the organic component.

To treat a relatively concentrated feedstream to yield a product residue stream with a high degree of depletion of the organic component may also demand a membrane array. In this case, the array may be a series arrangement such that the residue from one unit becomes the feed for the next. A series array may contain two, three or more sets of membrane units or steps. The permeate streams from the individual steps may conveniently, although not necessarily, be recycled within the array and mixed with a feed of similar organic concentration.

Depending on the nature and concentration of the organic vapor in the feedstream, and the performance required, it may be desirable to design the membrane system for carrying out the process as a mixed array. In this case, the system may contain both multiple steps and/or multiple stages, arranged in any combination. No matter whether the system for carrying out the process of the invention is composed of a single membrane unit, or multiple units arranged in a complex array, the factors influencing the system design will be the capital and operating costs of the system, the energy requirements, the feed composition and the desired product compositions.

Figure 4:
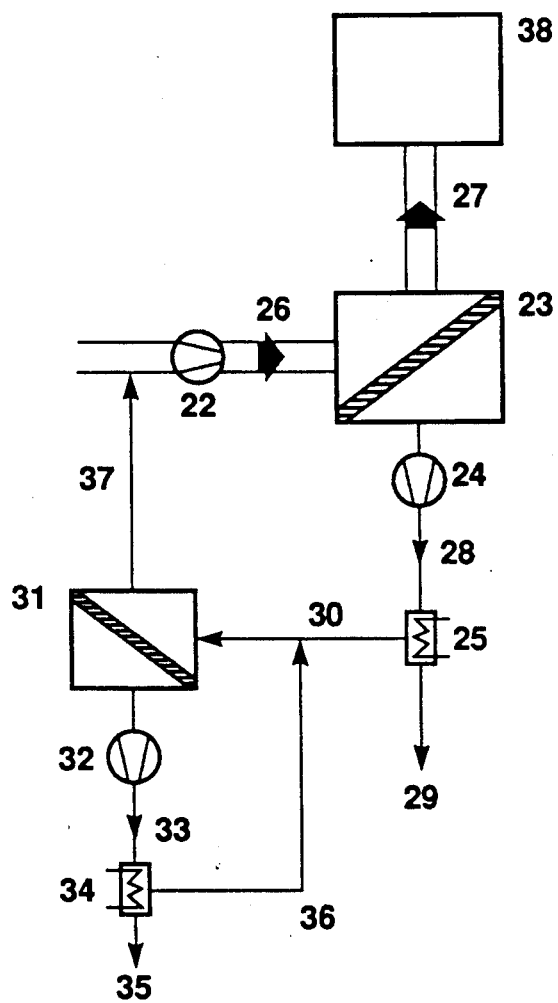
FIG. 4 is a schematic diagram of a two-stage membrane system for treating an organic-containing stream, with condensation of the permeate and recycle of the non-condensed fraction of the permeate.

A particularly preferred membrane configuration is a two-stage unit, a representative example of which is shown in FIG. 4. In many process and treatment technologies, two-stage systems are viewed as disadvantageous, and in fact tend to be disadvantageous, because costs are in direct proportion to the number of stages required. For membrane separation systems, on the other hand, costs scale in proportion to the volume of feed to be handled. Suppose that a single stage membrane system, selectively permeable to the organic component, can produce a permeate five-fold enriched in the organic component compared with the feed. The bulk of the feed will pass through the membrane module and exit as the residue. Depending on the membrane selectivity and the stage cut at which the process is operated, the volume of the permeate will be significantly less than that of the feed, and may be as low as 20% or less of the feed volume. It is this permeate stream that forms the feed to the second membrane stage. Therefore the membrane area required to process this stream may be 20% or less of that required to handle the original feed. If the membrane type is the same as that in the first stage, a similar five-fold enrichment could be obtained. The membrane system as a whole, then could produce an overall 25-fold enrichment of the feed, using a system only 20% larger than that needed to obtain a five-fold enrichment. In terms of capital costs and performance, therefore, two-stage membrane systems are highly efficient and economical.

It should be understood that a five-fold enrichment has been cited above only as a representative figure. With appropriate membrane and system designs, it may be possible to achieve higher levels of enrichment per stage. Lower levels of enrichment may also be adequate in some circumstances. What is important is that the membrane fractionation process bring the permeate stream to a concentration within the range where condensation or other conventional technology becomes a viable treatment option. If a feed stream is already more than 50% saturated with the organic component, then direct treatment by condensation or incineration, rather than employing the fractionation process of the invention, is preferred. If the feed stream is less than 50% saturated, and especially if the feed stream is less than 30% saturated, or 20% saturated, then the process of the invention is indicated. A stream that was 20% saturated would be brought to saturation if the organic concentration were increased five-fold; a stream that was originally 10% saturated would be brought to saturation by 10-fold enrichment, and so on. A stream that is saturated at ambient conditions can usually be condensed to recover the bulk of the organic without having to resort to excessive pressure/temperature conditions. Therefore membrane fractionation processes that can achieve five-fold or better organic enrichment and most preferably 10-fold or better organic enrichment, are preferred.

The invention is now further illustrated by the following examples, which are intended to be illustrative of the invention, but are not intended to limit the scope or underlying principles in any way.

EXAMPLES

The examples are in two groups. The first group covers the results obtained in a series of experiments carried out according to the general procedure described below. These experiments were performed to determine that separation of organic vapors from gas streams, with adequate selectivity, can be achieved. The experiments were performed with a single membrane module, usually operated at low stage cut, to optimize the concentration of organic vapor in the permeate stream. There was no attempt made in these simple experiments to control the concentration of organic in the residue stream. Having demonstrated that adequate separation is possible, the second set of examples takes representative separations and illustrates how membrane fractionation systems can be designed to achieve both permeate and residue streams with organic vapor concentrations in the desired ranges.

GROUP 1 EXAMPLES

Experimental procedure for single module experiments

All sample feedstreams were evaluated in a laboratory test system containing one spiral-wound membrane module. The tests were run at room temperature. The air in the feed cycle was replaced with nitrogen from a pressure cylinder prior to the experiment. Nitrogen was continuously fed into the system during the experiment to replace the nitrogen lost into the permeate. Organic vapor was continuously fed into the system by either pumping liquid organic into the residue line using a syringe pump and evaporating the organic using additional heating, or sending a bypass stream of the residue through a wash bottle containing the liquid organic. The feed and residue organic concentrations were determined by withdrawing samples from the appropriate lines by syringe and then subjecting these to gas chromatograph (GC) analysis. A small bypass stream was used to take the samples at atmospheric pressure instead of the elevated pressure in the lines. Two liquid nitrogen traps were used to condense the organic contained in the permeate stream. A non-lubricated rotary-vane vacuum pump was used on the permeate side of the module. The permeate pressure used in the experiments was about 1-5 cmHg. The samples from the permeate stream were taken using a detachable glass vessel constantly purged with a bypass stream of the permeate. Upon sampling, the vessel was detached and air was allowed to enter the vessel. The concentration in the vessel was determined by gas chromatography. The permeate concentration was then calculated from the relationship:

$$\text{permeate conc.} = \text{conc. in vessel} \times \left( \frac{76 \text{ cmHg}}{\text{permeate pressure (cmHg)}} \right) \quad (18)$$

The procedure for a test with the system was as follows:
1. The system was run without organic under maximum permeate vacuum to replace the air in the loop with nitrogen.
2. The nitrogen permeate flow rate was determined by measuring the vacuum pump exhaust flow rate. This provided a quality check on the module.
3. The feed flow, feed pressure and permeate pressure were adjusted to the desired values. The cold trap was filled with liquid nitrogen.
4. The organic input was started and the feed concentration was monitored with frequent injections into the GC. The permeate pressure was adjusted if necessary.
5. The system was run until the feed analysis showed that steady state had been reached.
6. All parameters were recorded and a permeate sample was taken and analyzed.
7. Step 6 was repeated after 10-20 minutes. The feed concentration was monitored after each parameter change to ensure steady state had been reached.

EXAMPLE 1

Figure 6:
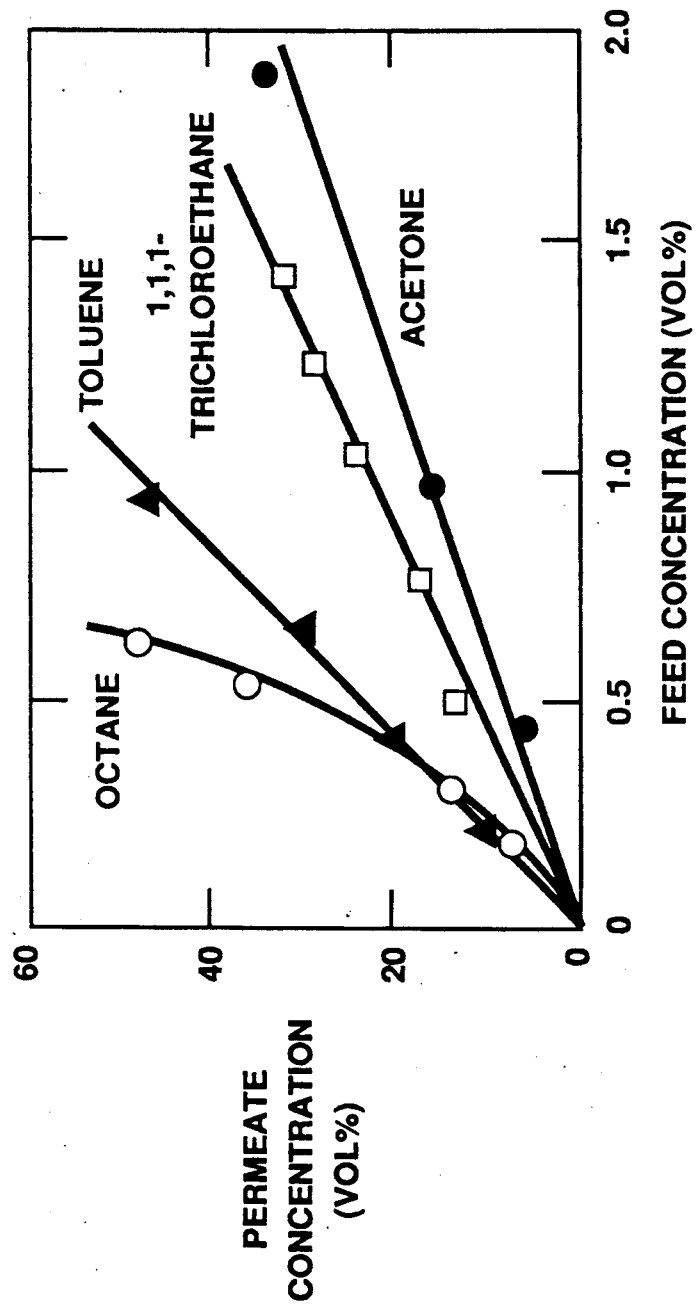
FIG. 6 is a graph showing the relationship between feed and permeate concentrations of acetone, 1,1,1-trichloroethane, toluene and octane.

The experimental procedures described above were carried out using a membrane module containing a composite membrane with an area of 1,100 cm$^2$. The feedstream comprised nitrogen and acetone, the acetone concentration in the feed varying from about 0.4% to 2%. A plot of acetone concentration in the feed against acetone concentration in the permeate is given by the lowest curve in FIG. 6. Typically the permeate was enriched about 18-fold compared with the feed. A feedstream containing 0.45% acetone yielded a permeate containing 8% acetone. The selectivity for acetone over nitrogen was found to be in the range 15-25, depending on the feed concentration of acetone and other operating parameters.

EXAMPLE 2

The experimental procedures described above were carried out using a membrane module containing a composite membrane with an area of 1,100 cm$^2$. The feedstream comprised nitrogen and 1,1,1-trichloroethane, the trichloroethane concentration in the feed varying from about 0.5% to 1.5%. A plot of trichloroethane concentration in the feed against trichloroethane concentration in the permeate is given by the second lowest curve in FIG. 6. Typically the permeate was enriched about 24-fold compared with the feed. A feedstream containing 0.5% trichloroethane yielded a permeate containing 13% trichloroethane.

EXAMPLE 3

The experimental procedures described above were carried out using a membrane module containing a composite membrane with an area of 1,100 cm$^2$. The feedstream comprised nitrogen and toluene, the toluene concentration in the feed varying from about 0.2% to 1%. A plot of toluene concentration in the feed against toluene concentration in the permeate is given by the third curve in FIG. 6. Typically the permeate was enriched about 48-fold compared with the feed. A feedstream containing 0.65% toluene yielded a permeate containing 30% toluene.

EXAMPLE 4

The experimental procedures described above were carried out using a membrane module containing a composite membrane with an area of 1,100 cm$^2$. The feedstream comprised nitrogen and octane, the octane concentration in the feed varying from about 0.1% to 0.6%. A plot of octane concentration in the feed against octane concentration in the permeate is given by the uppermost curve in FIG. 6. Typically the permeate was enriched at least 50-60 fold compared with the feed. A feedstream containing 0.3% octane yielded a permeate containing 14% octane.

EXAMPLE 5

Figure 7:
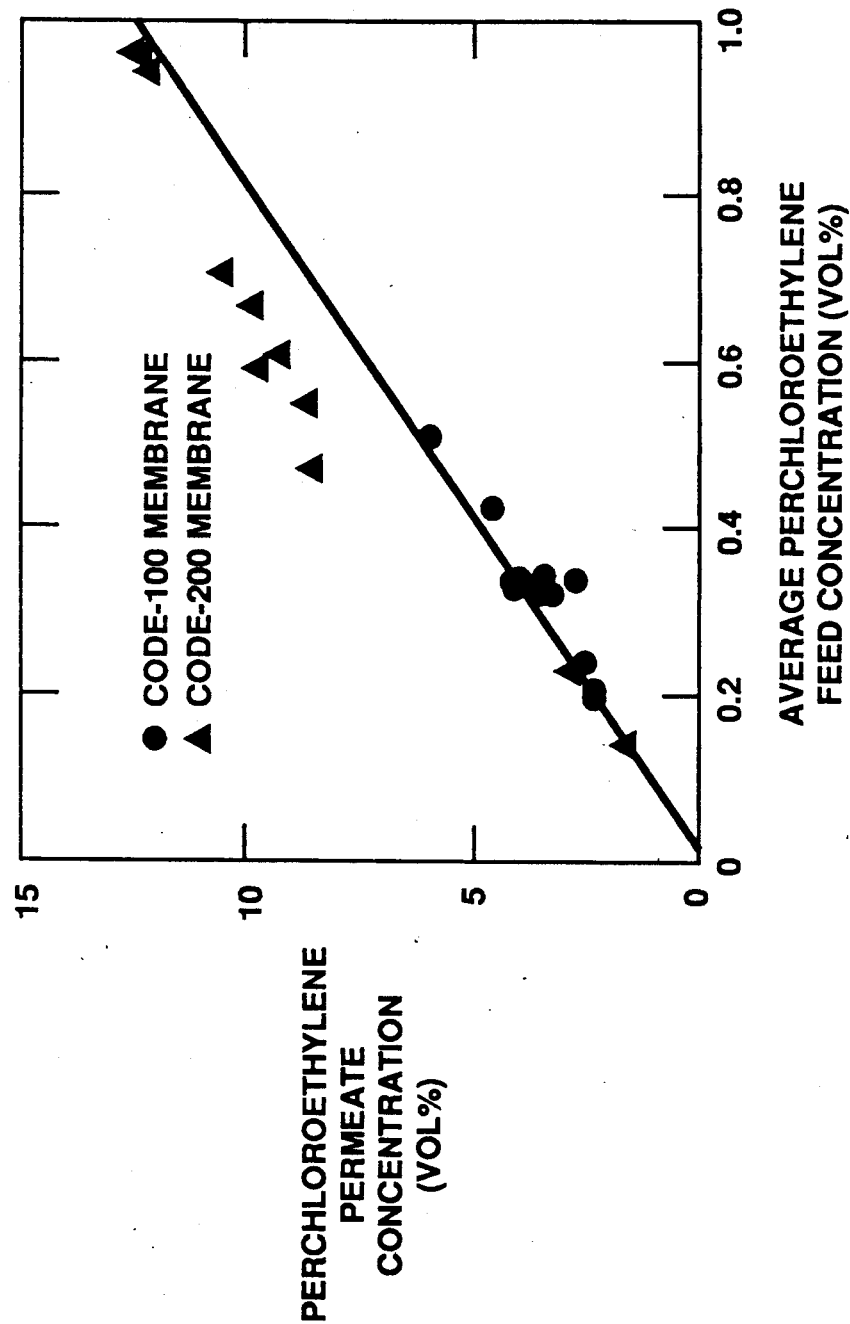
FIG. 7 is a graph showing the relationship between feed and permeate concentrations of perchloroethylene.

The experimental procedures described above were carried out using two different membrane modules containing composite membranes with different rubbers as the permselective layer, but both with membrane areas of 3,200 cm$^2$. The feedstream comprised nitrogen and perchloroethylene, the perchloroethylene concentration in the feed varying from about 0.2% to 0.8%. A plot of perchloroethylene concentration in the feed against perchloroethylene concentration in the permeate is given in FIG. 7. The open circles are for one module; the triangles for the other. Typically the permeate was enriched at least 10-12 fold compared with the feed. A feedstream containing 0.2% perchloroethylene yielded a permeate containing 2.2% perchloroethylene. A feedstream containing 0.5% perchloroethylene yielded a permeate containing 8.3% perchloroethylene.

EXAMPLE 6

Figure 8:
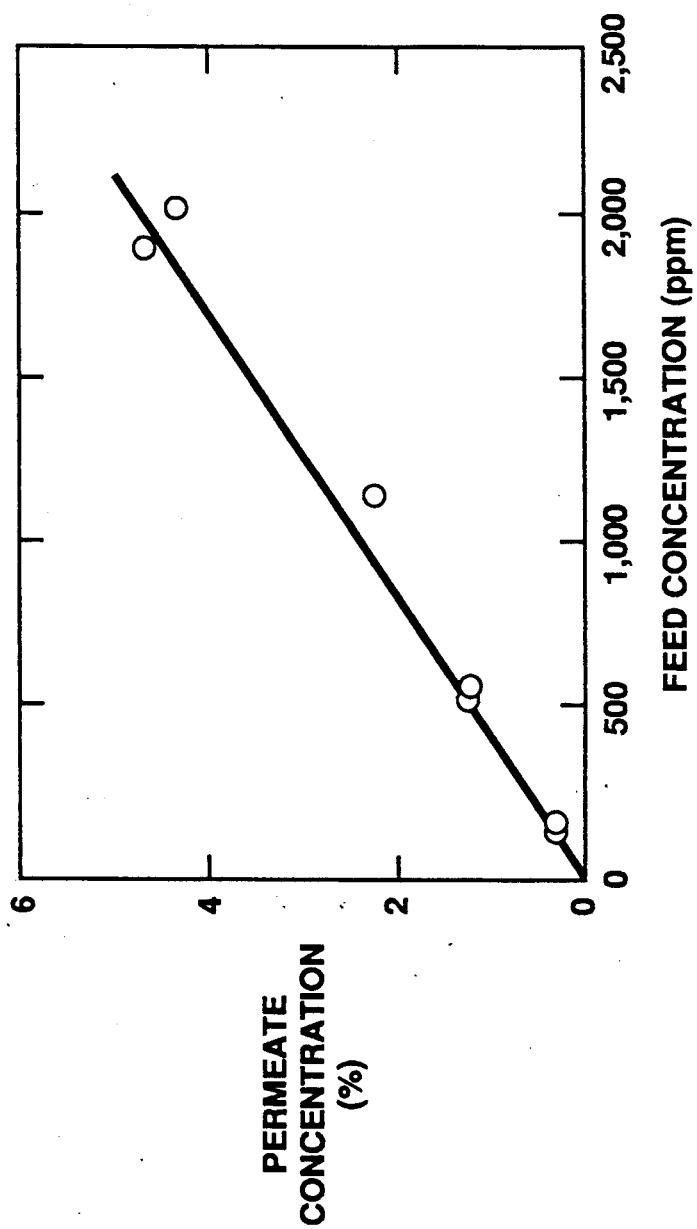
FIG. 8 is a graph showing the relationship between feed and permeate concentrations of CFC-11 at low CFC feed concentrations.

The experimental procedures described above were carried out using a feedstream containing CFC-11 ($CCl_3F$) in nitrogen in concentrations from 100-2,000 ppm. The module contained a composite membrane with an area of approximately 2,000 $cm^2$. The results are summarized in FIG. 8. The calculated $CFC/N_2$ selectivity of the module increased slightly from 22 at 100 ppm to 28 at 2,000 ppm.

EXAMPLE 7

Figure 9:
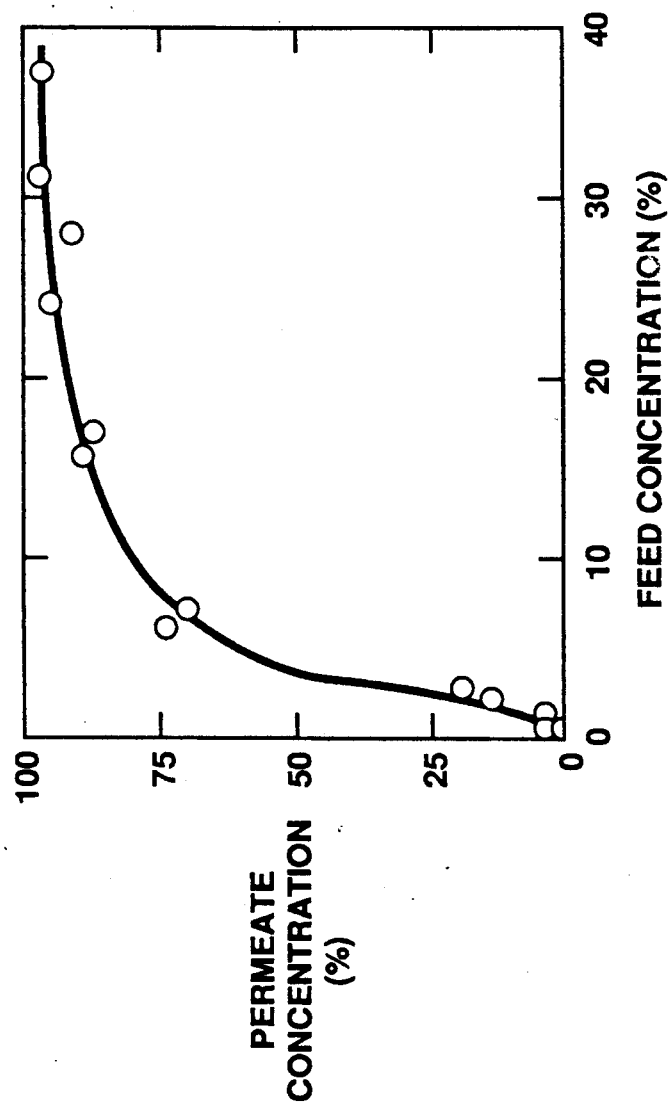
FIG. 9 is a graph showing the relationship between feed and permeate concentrations of CFC-11 at CFC feed concentrations up to about 35 vol %.

The experimental procedures described were carried out using a feedstream containing CFC-11 ($CCl_3F$) in nitrogen in concentrations from 1-35%. The module contained a composite membrane with an area of approximately 2,000 $cm^2$. The results are summarized in FIG. 9. The calculated $CFC/N_2$ selectivity of the module increased from 30 at 1 vol % to 50 at 35 vol %. This effect may be attributable to plasticization of the membrane material by sorbed hydrocarbon. Both hydrocarbon and nitrogen fluxes increased with increasing hydrocarbon feed concentration. The selectivity for CFC-11 over nitrogen was found to be in the range 30-50.

EXAMPLE 8

Figure 10:
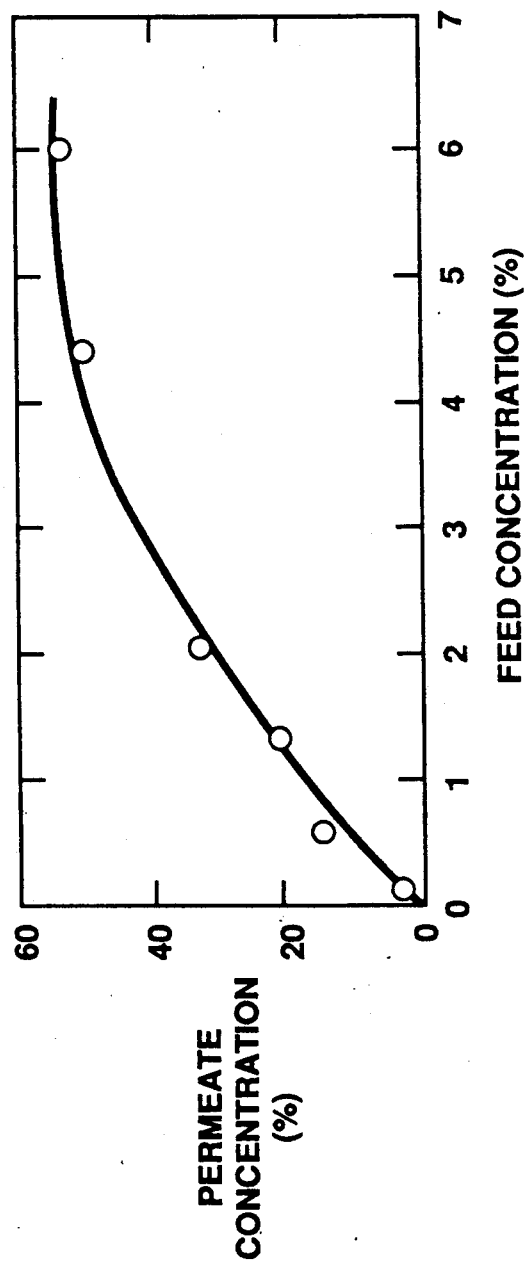
FIG. 10 is a graph showing the relationship between feed and permeate concentrations of CFC-113 at CFC feed concentrations up to about 6 vol %.

The experimental procedures described were carried out using a feedstream containing CFC-113 ($C_2Cl_3F_3$) in nitrogen in concentrations from 0.5-6%. The module contained a composite membrane with an area of approximately 2,000 $cm^2$. The results are summarized in FIG. 10. The calculated $CFC/N_2$ selectivity of the module remained constant at about 25 over the feed concentration range.

EXAMPLE 9

Figure 11:
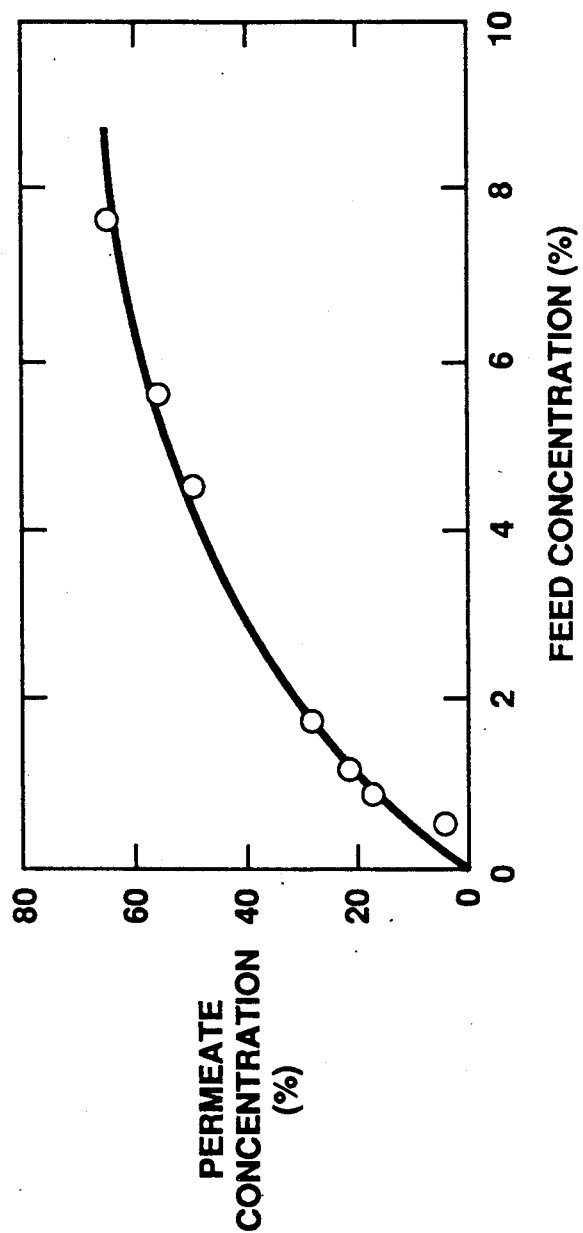
FIG. 11 is a graph showing the relationship between feed and permeate concentrations of HCFC-123 at CFC feed concentrations up to about 8 vol %.

The experimental procedures described were carried out using a feedstream containing HCFC-123 ($C_2HCl_2F_3$) in nitrogen in concentrations from 0.5-8%. The module contained a composite membrane with an area of approximately 2,000 $cm^2$. The results are summarized in FIG. 11. The calculated $CFC/N_2$ selectivity of the module remained constant at about 25 over the feed concentration range.

EXAMPLE 10

Figure 12:
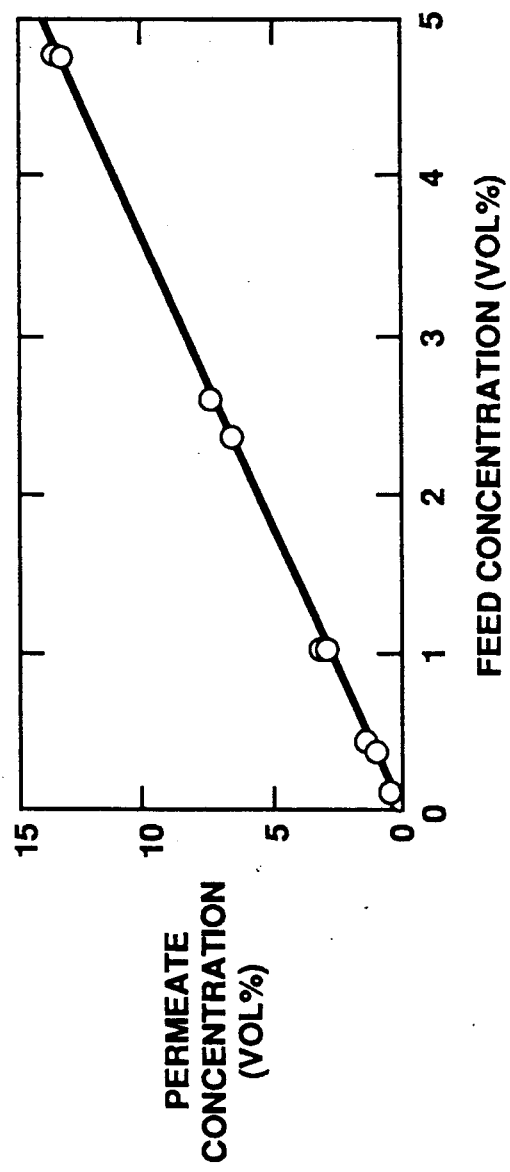
FIG. 12 is a graph showing the relationship between feed and permeate concentrations of Halon-1301 at concentrations from about 0.1% to 5%.

The experimental procedures described were carried out using a feedstream containing Halon-1301 ($CF_3Br$) in nitrogen in concentrations from 0.1-5%. The module contained a composite membrane with an area of approximately 2,000 $cm^2$. The results are summarized in FIG. 12. A Halon/nitrogen selectivity of about 4 was obtained.

EXAMPLE 11

Figure 13:
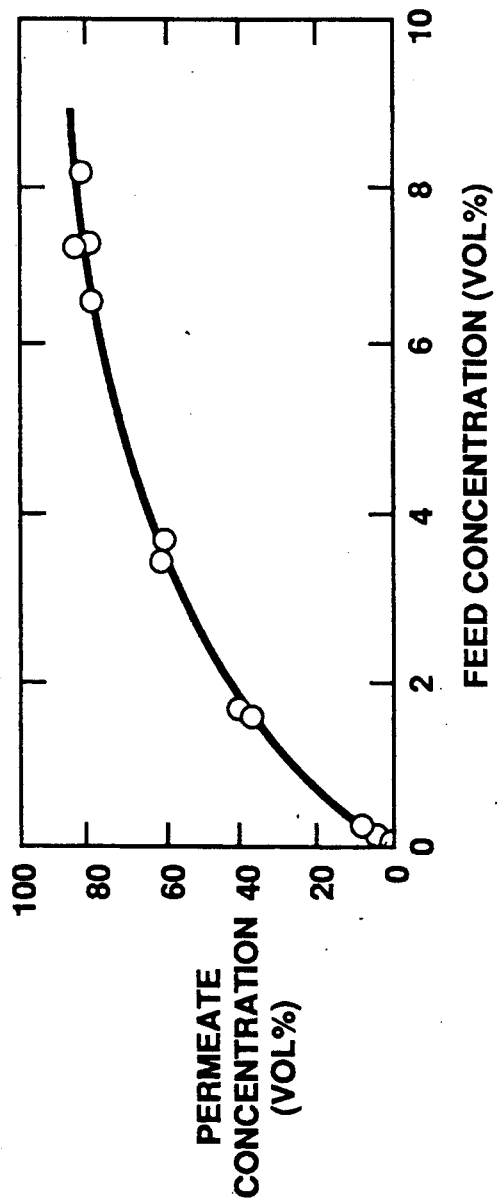
FIG. 13 is a graph showing the relationship between feed and permeate concentrations of methylene chloride at feed concentrations up to about 8%.

The experimental procedures described above were carried out using a membrane module containing a composite membrane with an area of 2,000 $cm^2$. The feedstream comprised nitrogen and methylene chloride, the methylene chloride concentration in the feed varying from about 0.1% to 8%. A plot of methylene chloride concentration in the feed against methylene chloride concentration in the permeate is given in FIG. 13. Typically the permeate was enriched about 30-fold compared with the feed at low feed concentrations. At higher concentrations the degree of enrichment dropped to about 10-20 fold. A feedstream containing 2% methylene chloride yielded a permeate containing 44% methylene chloride. A feedstream containing 8% methylene chloride yielded a permeate containing 84% methylene chloride.

GROUP 2 EXAMPLES

Examples 12-16

System designs and analyses

In the following analyses, it is assumed that the streams to be treated are available at ambient pressure and that the driving force for permeation is created by compressing the feed to 15 psig and lowering the permeate pressure to 1-5 cmHg. The calculations presented here are all based on the organic vapor over nitrogen selectivities determined in single module experiments of the type described in the first group of examples. The calculations were performed using a computer program based on the gas permeation equations for cross flow conditions described by Shindo et al., "Calculation Methods for Multicomponent Gas Separation by Permeation," *Sep. Sci. Technol.* 20, 445-459 (1985). The membrane area required was generated by the computer program. The capacities of the vacuum pumps and compressors were obtained or extrapolated from performance specification charts and other data from the manufacturers. Energy calculations were done by calculating the adiabatic ideal work of compression and dividing by the efficiency of the unit. Compressor efficiency was taken to be 60%: vacuum pump efficiency was taken to be 35%.

EXAMPLE 12

The performance of a two-stage membrane system, having a configuration similar to that shown in FIG. 3, in fractionating a 1,000 scfm stream containing 0.5% CFC-113 ($C_2Cl_3F_3$), was analyzed. The feedstream is compressed to 15 psig and passes through the first membrane stage, having an area of 1,070 $m^2$. A pressure drop across the membrane is provided by a vacuum pump on the permeate side. The residue stream contains 250 ppm CFC-113 at 995 scfm and the permeate stream produced by this first stage contains 2.3% CFC-113. This permeate stream is recompressed and passed to the second membrane stage, having an area of 200 $m^2$, where the CFC content is reduced to 0.5%. The residue stream from the second stage is recirculated to the inlet of the first membrane stage. The permeate stream produced by the second stage contains 11.2% CFC-113 and is suitable for treatment by condensation. For example, the stream could be compressed to 100 psig and chilled to 5° C. to recover the bulk of the CFC-113. The condenser bleed stream could be returned to the inlet of the second membrane stage. The function of the second stage is thus to further concentrate the CFC-113 to make condensation feasible. The second stage is one-fifth of the size of the first stage. Table 2 summarizes the performance of such a system, including the compression condensation operation.

TABLE 2

|  | FEED | PERMEATE | RESIDUE |
|---|---|---|---|
| Flow (scfm) | 1,000 | 140 lb/h liquid | 995 |
| Concentration (%) | 0.5 | 11.2 | 250 ppm |
| Membrane Selectivity |  | 25 |  |
| Membrane Area |  | 1,270 $m^2$ |  |

TABLE 2-continued

|  | FEED | PERMEATE | RESIDUE |
|---|---|---|---|
| Vacuum Pumps |  | 248 hp |  |
| Compressors |  | 155 hp |  |

The process as configured yields only two streams: a residue stream containing 250 ppm CFC and a clean liquid CFC permeate stream. The capital cost of the system, including pumps, compressors and membrane system, was estimated to be $680,000 or $600/scfm feed. Operating cost was estimated at $316,000 per year or 33 cents/lb CFC-113 recovered. CFC-113 currently costs about $1-1.50/lb, and other CFCs can cost up to $7/lb, so membrane fractionation leading to recovery of the CFC is extremely attractive.

EXAMPLE 13

A second system, designed to treat the same 1,000 scfm stream of 0.5% CFC-113, was evaluated. In this system the fractional removal of CFC-113 from the stream was increased from 95 to 99%. The system design used for the calculations was a two-step, two-stage system, combining system designs of the type shown in FIGS. 3 and 5, so that both the permeate and residue streams from the first membrane unit are passed to second membrane units. The two-step first stage, similar to that in FIG. 5, uses two membrane units with membrane areas of 850 m² and 820 m² respectively, producing two permeate streams. Pressure drops across the membranes are provided by vacuum pumps on the permeate side. The permeate stream from the first step contains 3.1% CFC-113 and becomes the feed stream for the second stage. The permeate stream from the second step contains 0.4% CFC-111 and is recompressed and recirculated to the feed of the first stage. The residue from the second step contains 50 ppm CFC-113 at 995 scfm. The second stage has a membrane area of 200 m², and produces a residue stream containing 0.5% CFC-113, which can be recycled to the feed of the first stage. The permeate from the second stage contains 11.2% CFC-113, and is suitable for treatment by compression condensation. For example, the stream can be compressed and condensed to yield liquid CFC-113 at a rate of 140 lb/h. A two-step, two-stage configuration is more effective than a simple two-stage configuration in applications where high solvent recoveries are required. Table 3 summarizes the system performance.

TABLE 3

|  | FEED | PERMEATE | RESIDUE |
|---|---|---|---|
| Flow (scfm) | 1,000 | 140 lb/h Liquid | 995 |
| Concentration (%) | 0.5 | 11.2 | 50 ppm |
| Membrane Selectivity |  | 25 |  |
| Membrane Area |  | 1,870 m² |  |
| Vacuum Pumps |  | 326 hp |  |
| Compressors |  | 227 hp |  |

The process as configured yields only two streams: a residue stream containing 50 ppm CFC and a clean liquid CFC permeate stream. The estimated capital cost of the system was $956,000 or $956/scfm feed. Operating cost was estimated to be $446,000 per year or 40 cents/lb CFC-113 recovered.

Comparing Examples 12 and 13, recovering 99% of the CFC-113 is about 1.4 times more expensive than recovering 95% of the CFC-113.

EXAMPLE 14

The performance of a two-stage membrane system, having a configuration similar to that in FIG. 3, in fractionating a 1,000 scfm stream containing 2% 1,1,1-trichloroethane, was analyzed. The stream is compressed to 15 psig and passes through the first membrane stage, having an area of 583 m². A pressure drop across the membrane is provided by a vacuum pump on the permeate side. The permeate pressure used in the calculations was 5 cmHg. The residue stream contains 0.2% 1,1,1-trichloroethane at 500 scfm and the permeate stream contains 10.8% 1,1,1-trichloroethane. This permeate stream is recompressed and then passed to a second membrane stage, having an area of 121 m², where the 1,1,1-trichloroethane content is reduced to 2%. The residue stream from the second stage, having an organic concentration of 2% and a flow of 159 scfm, is recirculated to the inlet of the first membrane stage. The permeate stream produced by the second stage contains 46.6% 1,1,1-trichloroethane, and has a volume of 38 scfm. Such a stream could be treated by compressing and cooling to about 5° C. to recover pure 1,1,1-trichloroethane in liquid form. Any non-condensed fraction could be returned to the membrane unit.

Table 4 summarizes the performance of the system.

TABLE 4

|  | FEED | PERMEATE | RESIDUE |
|---|---|---|---|
| Flow (scfm) | 1,000 | 38 | 962 |
| Concentration (%) | 2.0 | 46.6 | 0.2 |
| Membrane Selectivity |  | 30 |  |
| Membrane Area |  | 704 m² |  |
| Vacuum Pumps |  | 219 hp |  |
| Compressors |  | 85 hp |  |

Capital cost was estimated to be roughly $900,000, and operating costs would be roughly $381,000/year.

EXAMPLE 15

The performance of a two-step membrane system, having a configuration similar to that shown in FIG. 5, in fractionating a 1,000 scfm stream containing 10% methylene chloride was analyzed. The stream is compressed to 15 psig and passes through the two membrane steps in series. The membrane units have areas of 319 m² and 280 m² respectively. Vacuum pumps on the permeate sides of the membranes provide a pressure drop across the membranes. The permeate pressures used in the calculations were 4 cmHg. The final residue stream contains 0.2% methylene chloride and has a flow rate of 807 scfm. The permeate from the first step contains 50.6% methylene chloride, has a flow rate of 194 scfm, and could be treated by condensation. The permeate from the second step contains 9.8% methylene chloride, has a flow rate of 93 scfm, and could be returned to the inlet to the first membrane step. Table 5 summarizes the performance of the system.

TABLE 5

|  | FEED | PERMEATE | RESIDUE |
|---|---|---|---|
| Fow (scfm) | 1,093 | 194 | 738 |
| (feed flow is 1,000 scfm input plus 93 scfm returned from second step) | | | |
| Concentration (%) | 10 | 50.6 | 0.2 |
| Membrane Selectivity |  | 40 |  |
| Membrane Area |  | 599 m² |  |
| Vacuum Pumps |  | 304 hp |  |
| Compressors |  | 80 hp |  |

Capital cost is estimated to be roughly $950,800 and operating cost is roughly $392,000/year.

EXAMPLE 16

Comparison of Membrane Fractionation and Carbon Adsorption Costs

Table 7 summarizes the operating conditions assumed for the carbon adsorption process in this comparison.

TABLE 7

Operating Conditions for Carbon Adsorption Halocarbon Removal and Recovery System

| | |
|---|---|
| Halocarbon removal: | 95% |
| Bed depth: | 3 ft |
| Operating capacity: | 8 lb halocarbon/100 lb carbon |
| Steam Usage | 1 lb stream/lb carbon |
| Maximum halocarbon inlet concentration: | 0.5% |

The cost calculations used in the comparison are based on an EPA sponsored study by IT Enviroscience, Inc. ("Source Assessment: Chlorinated Hydrocarbon Manufacture," EPA Report #600/2-79/0196, NTIS #PB80-138209 (1979)). The study gives both capital and operating costs of carbon adsorption systems as a function of operating parameters. The capital and operating costs taken from the IT Enviroscience study were updated to mid-1988 values using the Chemical Engineering Cost Index. The depreciation and interest on the invested capital was the same as that used in the membrane system calculation. A system life of 10 years was assumed, although this may be optimistic for halocarbon solvents, where corrosion caused by acid formation can be a problem.

Figure 14:
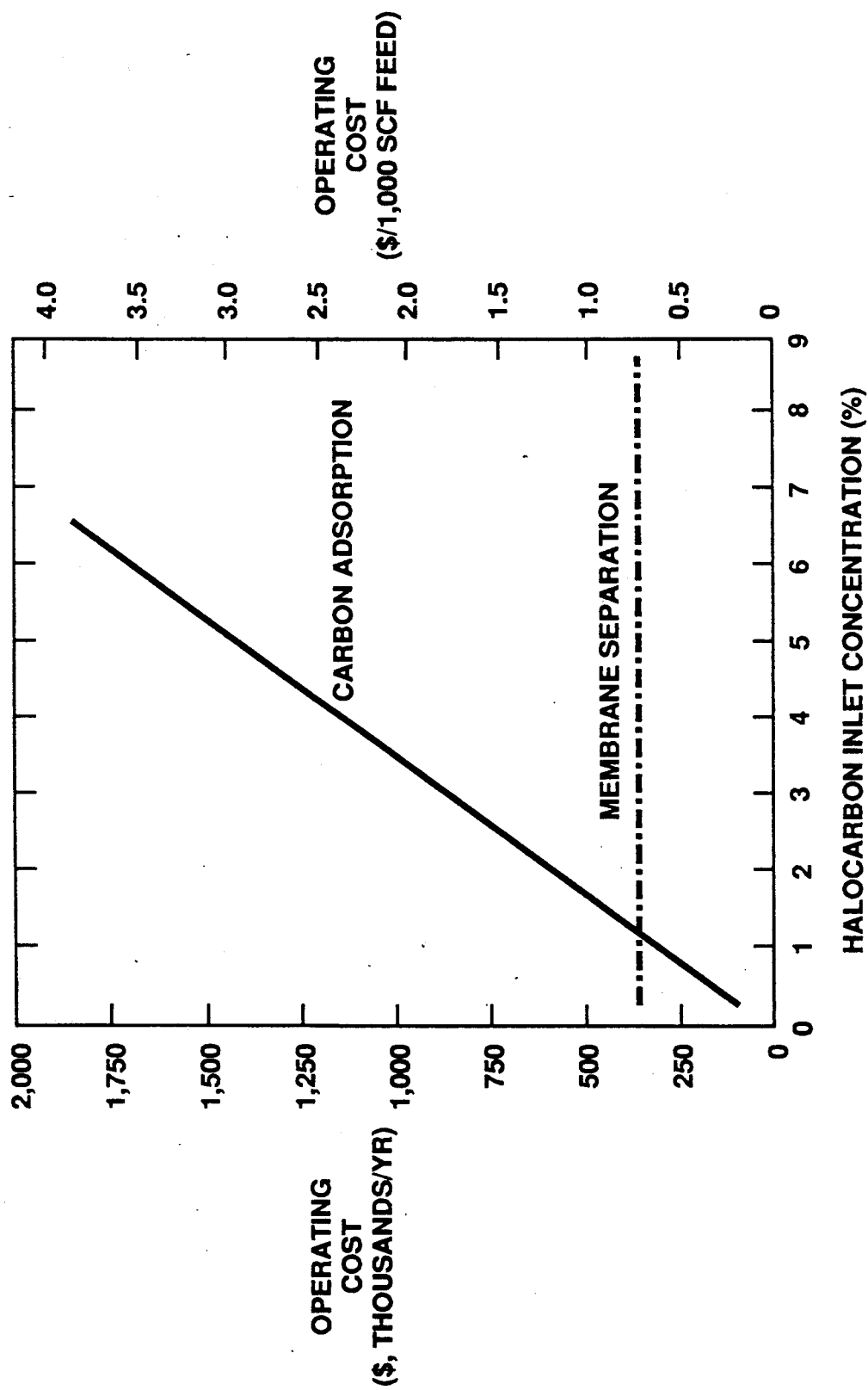
FIG. 14 is a graph showing the relationship between operating cost and vapor concentration for carbon adsorption and for membrane fractionation, for a 1,000 scfm halocarbon-containing stream.

The operating costs of carbon adsorption systems increase with halocarbon inlet concentration. FIG. 14 shows the operating costs as a function of the inlet concentration at a feed flow rate of 1,000 scfm. Membrane separation systems have lower operating costs than carbon adsorption systems if the inlet concentration is higher than 1.2%.

Figure 15:
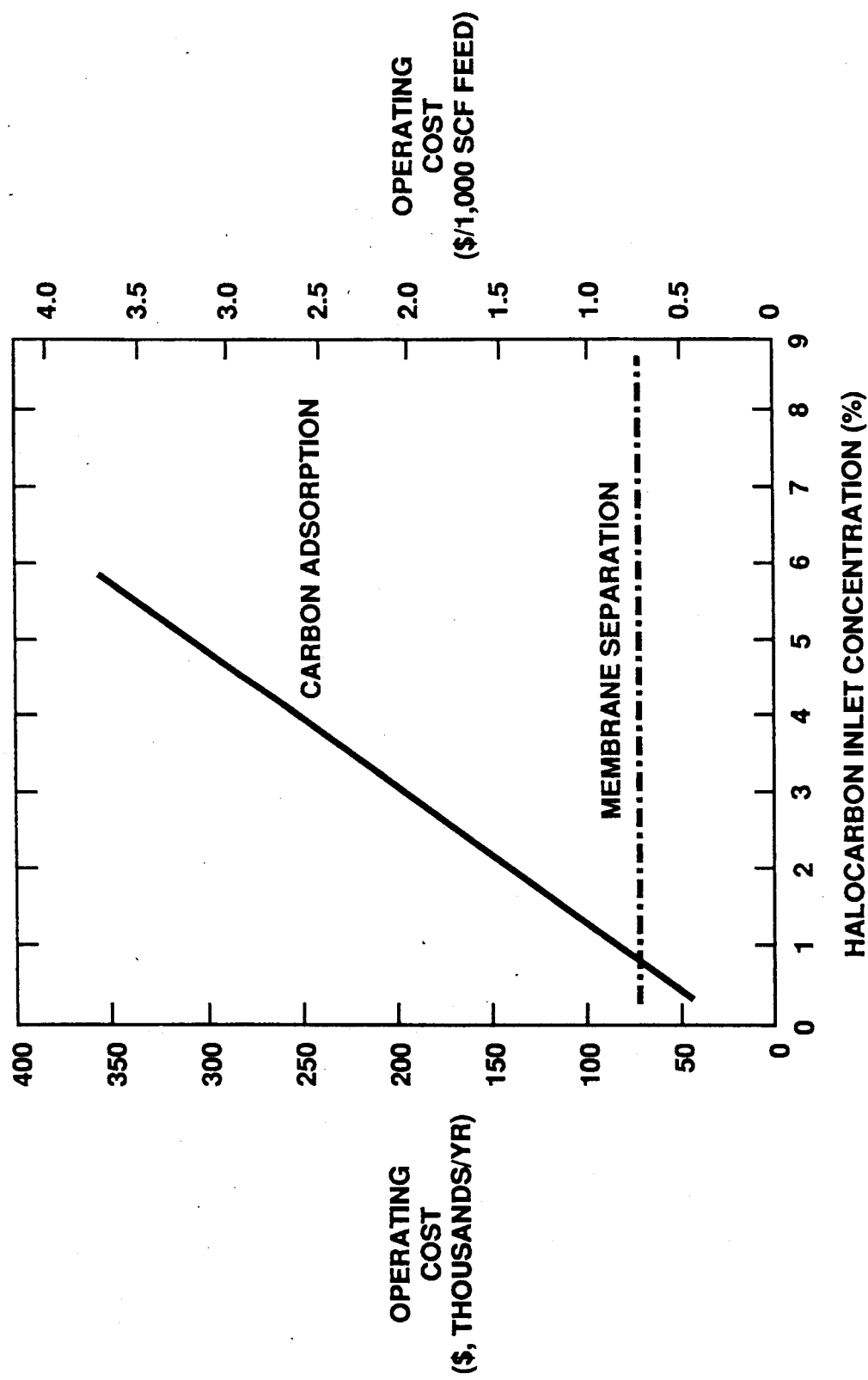
FIG. 15 is a graph showing the relationship between operating cost and vapor concentration for carbon adsorption and for membrane fractionation, for a 200 scfm halocarbon-containing stream.

FIG. 15 shows the operating costs for a system treating 200 scfm of air. The membrane system has lower operating costs than carbon adsorption if the halocarbon inlet concentration is more then 0.7%.

The operating costs used in producing FIGS. 14 and 15 include depreciation and interest on the invested capital. Thus, the relatively high capital cost of membrane systems has been taken into account. Any decrease in carbon adsorption system life when operated with halocarbons is not included in the operating cost data.

We claim:

1. A membrane fractionation process comprising:
   providing a membrane having a feed side and a permeate side;
   providing a pressure difference between the permeate and feed sides of the membrane, such that the ratio of the pressure on the permeate side to the pressure on the feed side is in the range 0.005–0.5;
   contacting said feed side with a feedstream comprising an organic component in vapor form in a concentration greater than 0.1% and less than 50% of the saturation concentration of said organic component at 1 atmosphere pressure and 20° C.;
   withdrawing from said permeate side a permeate stream enriched in said organic component compared with said feedstream and comprising said organic component in vapor form in a concentration greater than 20% of the saturation concentration at 1 atmosphere pressure and 20° C.;
   subjecting said permeate stream to a second, non-membrane, treatment process that removes organic component from said permeate stream;
   withdrawing from said feed side a residue stream depleted in said organic component compared with said feedstream and comprising said organic component in vapor form in a concentration less than 0.5%; and
   subjecting said residue stream to a third, non-membrane, treatment process that removes organic component from said residue stream.

2. The process of claim 1, wherein said second, non-membrane, treatment process comprises condensation.

3. The process of claim 2, wherein a non-condensed fraction of said permeate stream from said condensation is recycled to said feed side of said membrane.

4. The process of claim 1, wherein said second, non-membrane, treatment process comprises incineration.

5. The process of claim 1, wherein said third, non-membrane, treatment process comprises carbon adsorption.

6. A membrane fractionation process comprising:
   providing a membrane array, each membrane within said array having a feed side and a permeate side;
   providing a pressure difference between the permeate and feed sides of each membrane, such that the ratio of the pressure on the permeate side to the pressure on the feed side of each membrane is in the range 0.005–0.5;
   contacting said membrane array with a feedstream comprising an organic component in vapor form in a concentration greater than 0.1% and less than 50% of the saturation concentration of said organic component at 1 atmosphere pressure and 20° C.;
   withdrawing from said membrane array a product permeate stream enriched in said organic component compared with said feedstream and comprising said organic component in vapor form in a concentration greater than 20% of the saturation concentration at 1 atmosphere pressure and 20° C.;
   subjecting said product permeate stream to a second, non-membrane, treatment process that removes organic component from said product permeate stream;
   withdrawing from said membrane array a product residue stream depleted in said organic component compared with said feedstream and comprising said organic component in vapor form in a concentration less than 0.5%; and
   subjecting said product residue stream to a third, non-membrane, treatment process that removes organic component from said product residue stream.

7. A membrane fractionation process comprising:
   providing a first membrane having a first feed side and a first permeate side;
   providing a pressure difference between said first permeate and feed sides of said first membrane, such that the ratio of the pressure on said first permeate side to the pressure on said first feed side is in the range 0.005–0.5;
   contacting said first feed side with a feedstream comprising an organic component in vapor form in a concentration greater than 0.1% and less than 50% of the saturation concentration of said organic component at 1 atmosphere pressure and 20° C.;

withdrawing from said first feed side a first residue stream depleted in said organic component compared with said feedstream and comprising said organic component in vapor form in a concentration less than 0.5%;

subjecting said first residue stream to a second, non-membrane, treatment process that removes organic component from said first residue stream;

withdrawing from said first permeate side a first permeate stream enriched in said organic component in vapor form compared with said feedstream;

providing a second membrane having a second feed side and a second permeate side;

providing a pressure difference between said second permeate and feed sides of said second membrane, such that the ratio of the pressure on said second permeate side to the pressure on said second feed side is in the range 0.005–0.5;

contacting said second feed side of said second membrane with said first permeate stream;

withdrawing from said second feed side a second residue stream depleted in said organic component in vapor form compared with said first permeate stream;

withdrawing from said second permeate side a second permeate stream enriched in said organic component compared with said first permeate stream and comprising said organic component in vapor form in a concentration greater than 20% of the saturation concentration at 1 atmosphere pressure and 20° C.; and subjecting said second permeate stream to a third, non-membrane, treatment process that removes organic component from said second permeate stream.

8. A membrane fractionation process comprising:

providing a first membrane having a first feed side and a first permeate side;

providing a pressure difference between said first permeate and feed sides of said first membrane, such that the ratio of the pressure on said first permeate side to the pressure on said first feed side is in the range 0.005–0.5;

contacting said first feed side with a feedstream comprising an organic component in vapor form in a concentration greater than 0.1% and less than 50% of the saturation concentration of said organic component at 1 atmosphere pressure and 20° C.;

withdrawing from said first permeate side a first permeate stream enriched in said organic component compared with said feedstream and comprising said organic component in vapor form in a concentration greater than 20% of the saturation concentration of said organic component at 1 atmosphere pressure and 20° C.;

subjecting said first permeate stream to a second, non-membrane, treatment process that removes organic component from said first permeate stream;

withdrawing from said first feed side a first residue stream depleted in said organic component in vapor form compared with said feedstream;

providing a second membrane having a second feed side and a second permeate side;

providing a pressure difference between said second permeate and feed sides of said second membrane, such that the ratio of the pressure on said second permeate side to the pressure on said second feed side is in the range 0.005–0.5;

contacting said second feed side of said second membrane with said first residue stream;

withdrawing from said second permeate side a second permeate stream enriched in said organic component in vapor form compared with said first residue stream;

withdrawing from said second feed side a second residue stream depleted in said organic component compared with said first residue stream and comprising said organic component in vapor form in a concentration less than 0.5%; and subjecting said second residue stream to a third, non-membrane, treatment process that removes said organic component from said second residue stream.

* * * * *